United States Patent
Hollinger

(10) Patent No.: US 10,637,940 B2
(45) Date of Patent: Apr. 28, 2020

(54) STREAMING CONTENT BASED ON SKIP HISTORIES

(71) Applicant: Roku, Inc., Los Gatos, CA (US)

(72) Inventor: Joseph Hollinger, Los Gatos, CA (US)

(73) Assignee: ROKU, INC., Los Gatos, CA (US)

( * ) Notice: Subject to any disclaimer, the term of this patent is extended or adjusted under 35 U.S.C. 154(b) by 333 days.

(21) Appl. No.: 15/357,595

(22) Filed: Nov. 21, 2016

(65) Prior Publication Data

US 2018/0146054 A1    May 24, 2018

(51) Int. Cl.
*H04L 29/08* (2006.01)
*H04L 29/06* (2006.01)

(52) U.S. Cl.
CPC .......... *H04L 67/22* (2013.01); *H04L 65/4092* (2013.01); *H04L 65/607* (2013.01); *H04L 67/306* (2013.01)

(58) Field of Classification Search
CPC .... H04L 67/22; H04L 65/4092; H04L 65/607
See application file for complete search history.

(56) References Cited

U.S. PATENT DOCUMENTS

| | | | |
|---|---|---|---|
| 9,361,353 B1 * | 6/2016 | Aristides | G06F 16/735 |
| 2009/0150784 A1 | 6/2009 | Denney et al. | |
| 2015/0356080 A1 | 12/2015 | Brown et al. | |
| 2016/0037223 A1 * | 2/2016 | Casagrande | H04N 21/8456 386/230 |
| 2016/0088351 A1 * | 3/2016 | Petruzzelli | H04N 21/4334 725/23 |
| 2016/0274744 A1 * | 9/2016 | Neumann | H04N 21/252 |
| 2017/0188116 A1 | 6/2017 | Major et al. | |
| 2017/0332120 A1 * | 11/2017 | Maynard | H04N 21/812 |
| 2018/0098101 A1 * | 4/2018 | Pont | H04N 21/2187 |

OTHER PUBLICATIONS

International Search Report and Written Opinion of the International Searching Authority for International Application No. PCT/US17/61536, dated Jan. 30, 2018 (10 pages).

* cited by examiner

*Primary Examiner* — Hamza N Algibhah
*Assistant Examiner* — James Ross Hollister
(74) *Attorney, Agent, or Firm* — Sterne, Kessler, Goldstein & Fox, P.L.L.C.

(57) ABSTRACT

Streaming content based on skip histories is discussed herein. An embodiment operates by receiving a plurality of skip commands associated with a content from receivers while the receivers are displaying the content to users; generating a crowd source skip history for the content using at least the received skip commands; receiving a request for the content from a receiver; and transmitting a stream of the content to the receiver using the crowd source skip history for the content, such that a portion of the content identified by the crowd source skip history is excluded from the stream.

16 Claims, 6 Drawing Sheets

STREAMING CONTENT BASED ON SKIP HISTORIES

FIELD

This disclosure is generally directed to selectively streaming content based on skip histories.

BACKGROUND

With a rise in technology surrounding the control of delivering content, new types of data may be gathered and used to control the delivery (such as streaming) of content. Today, data used to control the delivery of content is from user input at the receiver receiving the content. This type of control requires a user's direct input to make any modification to the content as it is delivered.

But, this scheme for controlling the delivery of content does not allow for the automation of controlling the content. Users must manually input preferences before the content may be modified as desired. Requiring this of users causes a disruption in content service and negatively impacts user experience as the user must focus on modifying the content as desired and not on the content itself. Thus, this requires the user to manually input preferences every time there is a desire for the content to be modified.

SUMMARY

Provided herein are system, apparatus, article of manufacture, method and/or computer program product embodiments, and/or combinations and sub-combinations thereof, for streaming content based on skip histories.

An embodiment includes a method. The method may include receiving a plurality of skip commands associated with a content from receivers while the receivers are displaying the content to users. The method may further encompass generating a crowd source skip history for the content using at least the received skip commands and receiving a request for the content from a receiver. Additionally, the method may include transmitting a stream of the content to the receiver using the crowd source skip history for the content, such that a portion of the content identified by the crowd source skip history is excluded from the stream.

Another embodiment includes a system that may include a memory and at least one processor communicatively coupled to the memory. The processor may be configured to receive a plurality of skip commands associated with a content from receivers while the receivers are displaying the content to users. Further, the processor may be configured to generate a crowd source skip history for the content using at least the received skip commands and receive a request for the content from a receiver. Also, the processor may be configured to transmit a stream of the content to the receiver using the crowd source skip history for the content, such that a portion of the content identified by the crowd source skip history is excluded from the stream.

A further embodiment includes a tangible, non-transitory computer-readable device having instructions stored thereon that, when executed by at least one computing device, causes the computing device to perform operations. These operations may include receiving a plurality of skip commands associated with a content from receivers while the receivers are displaying the content to users. Additionally, the operations may encompass generating a crowd source skip history for the content using at least the received skip commands and receiving a request for the content from a receiver. Further, the operations may include transmitting a stream of the content to the receiver using the crowd source skip history for the content, such that a portion of the content identified by the crowd source skip history is excluded from the stream.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for streaming content based on skip histories.

Figure 1:
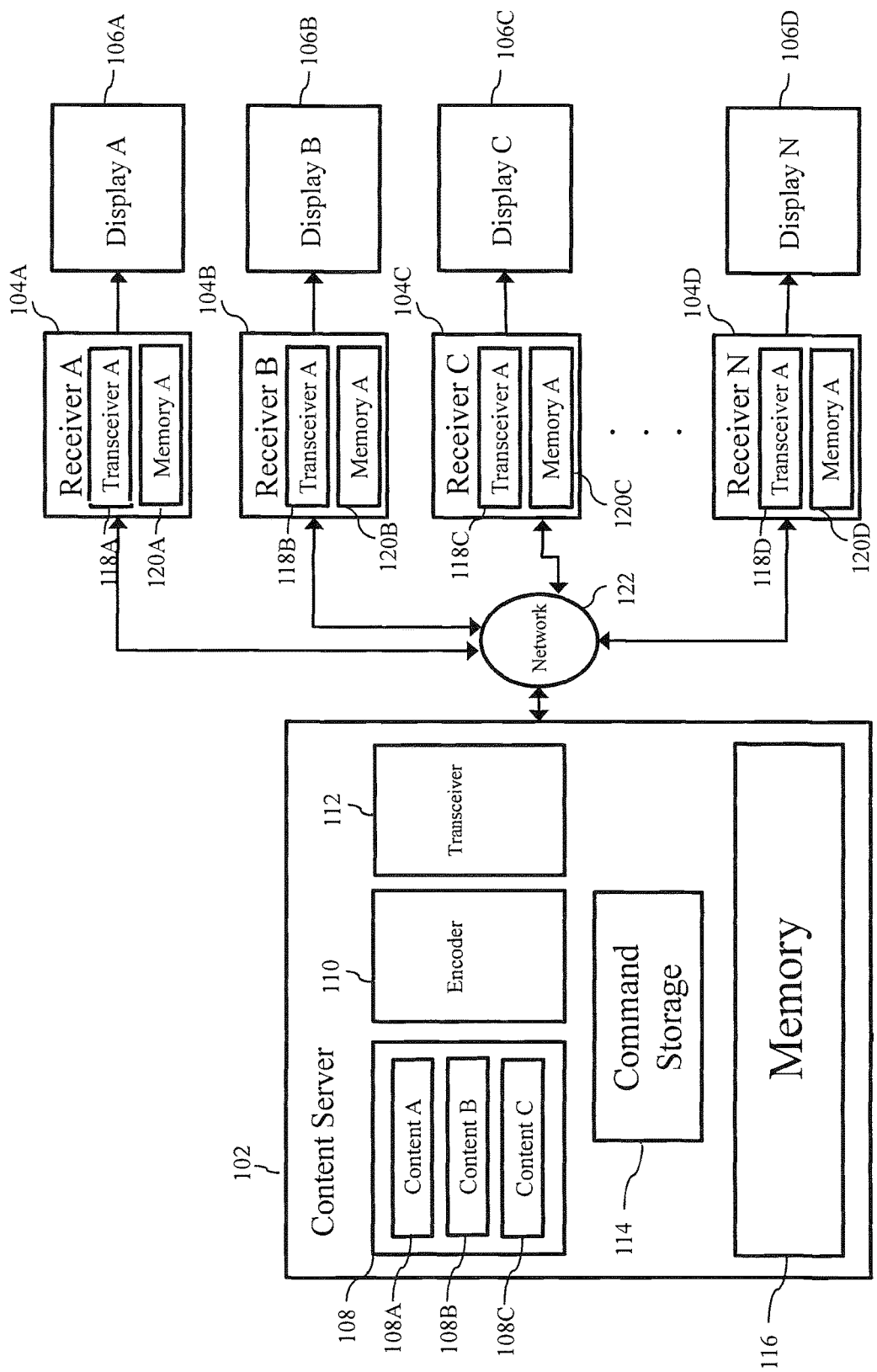
FIG. 1 is a block diagram of a system for crowd-sourced content skipping, according to some embodiments.

FIG. 1 is a block diagram 100 of a system for crowd-sourced content skipping, according to some embodiments. According to an embodiment, a system for crowd-sourced content skipping may comprise one or more content servers 102, a plurality of receivers 104 (comprising, for example, receiver A 104A, receiver B 104B, receiver C 104C, and receiver N 104D), and a plurality of displays 106 (comprising, for example, display A 106A, display B 106B, display C 106C, and display N 106N). In an embodiment, content server 102 may comprise a plurality of content 108 (comprising, for example, content A 108A, content B 108B, and content C 108C), encoder 110, transceiver 112, command storage 114, and memory 116. It should be noted that FIG. 1 shows an illustrative embodiment; other embodiments may include more or less devices than that shown in FIG. 1.

According to an embodiment, content server 102 may stream (or otherwise deliver) content 108 to receivers 104. In an embodiment, content 108 may comprise image sources, audio sources, television programs, movies, music, pictures, advertisements, streamable content, internet television, live content, games, software, and/or any combination thereof—to name a few examples. According to an embodiment, content 108 may be stored in memory 116. Memory 116 may comprise random access memory (RAM), read-only memory (ROM), electronically erasable programmable random access memory (EEPROM), hard disk drive (HDD), solid state drive (SSD), or any combination thereof—to name a few examples.

In an embodiment, content server 102 may stream or otherwise deliver content 108 via transceiver 112. For example, content server 102 may stream content A 108A via transceiver 112. According to an embodiment, transceiver 112 may stream, broadcast or otherwise deliver content 108 as analog television signals, digital television signals, satellite television signals, analog radio signals, digital radio signals, satellite radio signals, internet streaming (including dial-up, broadband, fiber, DSL, wireless, mobile network, and satellite internet), internet radio streaming, or any combination thereof—to name a few examples. Content servers 102 may communicate with receivers 104 via a network 122. The network 122 may be any communication media or mode, including wired and/or wireless intranet, extranet, Internet, cellular, Bluetooth and/or any other short range, long range, local, regional, global communications network, as well as any combination thereof, to name just a few examples.

According to an embodiment, content server 102 may encode and compress content streamed or otherwise delivered via encoder 110. For example, encoder 110 may encode content 106A before it is broadcast or streamed by transceiver 112. In an embodiment, encoder 110 may encode content 108 by a plurality of encoding and codec systems, such as NTSC, PAL, SECAM, FM, AM, DAB+, DMB, DTMB, ATSC, ISDB, DVB-S, DVB-S2, DVB-C, DVB-T, DTT, MMDS, MVDS, Flash, MPEG-1, MPEG-4, WMV, VP6, RealVideo, Real Audio, FLAC, ALAC, AMR, EVRC, or any combination thereof—to name a few examples.

In an embodiment, content 108 steamed or otherwise delivered via transceiver 112 may be received by any of receivers 104. According to an embodiment, each receiver 104 may comprise a radio, cable box, a television antenna, a television, a smart phone, a tablet, a streaming device, a gaming console, or any combination thereof—to name a few examples. According to an embodiment, each receiver 104 may include an associated transceiver 118 that may receive content 108 transmitted by transceiver 112 in content server 102. In an embodiment, receivers 104 may comprise any number of receivers.

According to an embodiment, each receiver 104 may display content 108 received from content server 102 on a respective display 106. In an embodiment, displays 106 may include televisions, monitors, phone screens, tablet screens, projectors, or any combination thereof—to name a few examples. In embodiments, displays 106 and receivers 104 may be distinct devices, or they may be integrated together. For example, display A 106A and receiver A 104A may be distinct devices, or they may be combined into a single device.

In an embodiment, a receiver 104 may receive a command from a user (via a remote control, smart phone, tablet, or any combination thereof—for example) to skip content while the receiver 104 is displaying received content 108 on its respective display 106. For example, receiver A 104A may receive a command to skip content while it is displaying content A 108A on display A 106A. According to an embodiment, a skip command may comprise stopping displayed content, fast forwarding displayed content, skipping the current content, playing new content, selecting the next content to be displayed, resuming content, or any combination thereof to name a few examples. For example, while receiver A 104A is displaying content A 108A on display 106A, receiver A 104A may receive a skip command to stop the display of content A 104A and to display content B 104B (in other words, to skip over content A 104A and move directly to the display of content B 104B). As another example, while receiver A 104A is displaying content A 108A on display 106A, receiver A 104A may receive a skip command to fast forward content A 104A and resume displaying content A 104A at a later point (i.e. after the portion of content A 104A that was fast forwarded). In an embodiment, a receiver 104 may receive a skip command from a user as interactions with buttons, gestures on a touch screen, mouse clicks, mouse drags, or any combination thereof—to name a few examples.

As noted above, each receiver 104 may include a respective transceiver 118. According to an embodiment, transceivers 118 may receive skip commands from users via a wired connection, internet connection, intranet connection, WIFI, infrared signal, Bluetooth signal, or any combination thereof—to name a few examples.

According to an embodiment, receivers 104 may store received skip commands in respective memories 120 (such as memory A 120A, memory B 102B, memory C 120C, and memory N 120D shown in FIG. 1). Memories 120 may comprise RAM, ROM, EEPROM, HDD, SSD, or any combination thereof—to name a few examples. For example, receiver A 104A may receive a skip command and store the skip command in memory A 120A. In an embodiment, receivers 104 may also store timestamps associated with received skip commands in respective memories 120. The associated timestamps may comprise data referring to the time when the commands were received, the playtime of the content when the skip command was received, the timing of the time counter when the skip command was received, the duration of a fast forward command, or any combination thereof—to name a few examples. For example, receiver A 104A may receive a skip command comprising a fast forward command while content A 108A is displayed. Receiver A 104A may store the skip command in memory A 120A along with an associated timestamp comprising the time counter of content A 108A when the skip command was received—i.e. the time within content A 108A that the skip command was received (for example, at the 45 second mark of content A 108A).

In an embodiment, when a receiver 104 stores a skip command and associated timestamp in memory 120, the receiver 104 may associate the skip command and associated timestamp with the content 108 that was being displayed when the skip command was received. For example, receiver A 104 A may be displaying content C 108C on a display 106A when receiver A 104 A receives a skip command. Receiver A 104A may then store the skip command and an associated timestamp in memory 120 and associate the skip command and associated timestamp with content C 108C. Associating the data together may encompass creating a pointer to data referencing the associated content, storing the skip commands and timestamps in the same table, column, or row as a reference to the associated content, or any combination thereof—to name a few examples.

In an embodiment, each receiver 104 may periodically transmit the skip commands and associated timestamps stored in memories 120, as well as information identifying itself, to content server 102 (or another server, wherein such other server or the content server 102 may be considered a crowd source server in some embodiments) via associated transceivers 118. The receiver 104 includes information identifying itself to enable the content server 102 to sort received skip commands and associated timestamps by the originating receivers 104. The period at which the skip commands and associated timestamps are transmitted to content server 102 may include a desired number of seconds, minutes, hours, days, or any combination thereof. For example, receiver A 104A may transmit stored skip commands and associated timestamps to content server 102 every 3 seconds, or at any other increment. According to an embodiment, a stored skip command and associated timestamp will only be sent to content server 102 once i.e. once a receiver 104 has sent a skip command and associated timestamp to content server 102, receiver 104 will not send the same skip command and associated timestamp to content server 102 again.

In an embodiment, content server 102 may store skip commands and associated timestamps received from receivers 104 and associated with respective content 108 in command storage 114. Command storage 114 may comprise RAM, ROM, EEPROM, HDD, SSD, or any combination thereof—to name a few examples.

According to an embodiment, one or more processors in content server 102 may determine, in a crowd source manner, the portion of a content 108 that was skipped by users from skip commands and associated timestamps stored in command storage 114. Determining the portion of a content 108 that was skipped may include comparing the associated timestamps to their associated content, analyzing skip commands and their associated content, comparing skip commands and their associated timestamps, or any combination thereof—to name a few examples. For example, command storage 114 may store a skip command 1 and associated timestamp 1 comprising a fast forward command at the 45 second mark of content C 108C and may further store a skip command 2 and associated timestamp 2 comprising a resume play command at the 126 second mark of content C 108C, all received from the same receiver 104. Command storage 114 may also store a skip command 3 and associated timestamp 3 comprising a fast forward command at the 47 second mark of content C 108C and may further store a skip command 4 and associated timestamp 4 comprising a resume play command at the 122 second mark of content C 108C, all received from the same or different receiver 104. In some embodiments, content server 102 may average the beginning and end of the skip commands ½ and ¾ to obtain a crowd sourced determination of the boundaries of the skipped portion of content C 108C. In the example above, the crowd sourced begin of the skip is the 46 second mark of content C 108C, and the crowd sourced end of the skip is the 124 second mark of content C 108C. In a similar manner, the content server 102 may update the crowd sourced begin and end of the skip as more skip commands and associated timestamps are received from receivers 104 for content C 108C. In some embodiments, only skip commands and associated timestamps within a predetermined threshold are considered in such updates. For example, in some embodiments, a skip command is used to update the crowd sourced boundaries of a skip if its associated timestamp is within a predetermined range of either the existing crowd sourced beginning or end of the skip (such as within 1 second or some other increment).

Figure 4:
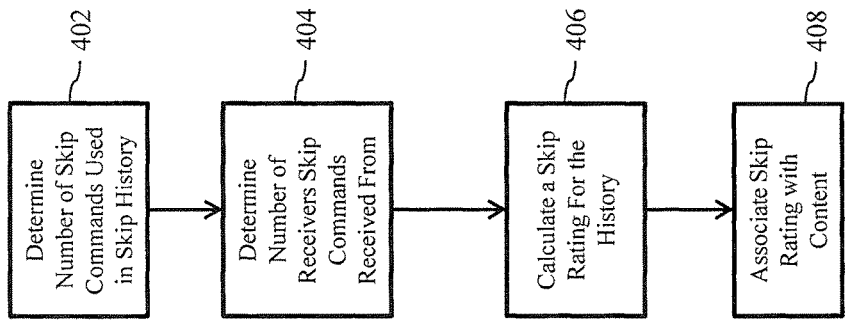
FIG. 4 is a flowchart illustrating a process for assigning a skip rating to a skip history, according to some embodiments.

According to an embodiment, content server 102 may track the content 108 streamed or otherwise delivered to receivers 104 to build viewer profiles for receivers 104 as discussed in FIG. 4. A viewer profile may include the selections, durations, types, timings, genres, runtimes, ratings, etc.—or any combination thereof—of the content streamed or otherwise delivered to a receiver 104. In an embodiment, content server 102 may store the tracked data and viewer profiles in memory 116.

In some embodiments, content server 102 may group receivers 104 based on tracking and analysis of their content viewing patterns, such as the portions of contents 108 (such as movies) that are watched once or multiple times, and the portions that are skipped. According to an embodiment, this information may be stored in command storage 114. For example, receivers 104 having users with similar viewing patterns may be grouped together, and a skip history for the group may be generated for a particular movie (or other content 108) based on the skip command activity of the receivers 104 in the group who have watched the movie. Thereafter, the content 108 may be stopped, paused, or skipped when watching the movie based on the skip history for the group in which the user is a member, using any of the embodiments discussed herein.

Additionally or alternatively, in some embodiments, receivers 104 may be clustered into groups based on user interface (UI) browsing behavior patterns. For example, how a receiver 104 navigates through the menu structure where content is listed for selection may be tracked. For example, any combination of the following GUI navigation behavioral characteristics may be tracked: (1) the order in which icons/tiles/options are navigated; (2) icons/tiles/options over which the user lingered; (3) icons/tiles/options that the user visited multiple times during a session; and/or (4) icons that the user clicked (these examples are provided for illustrative purposes only and are not limiting; any other UI navigational characteristic may also or alternatively be tracked. Similar to that just described, receivers 104 with similar GUI navigation patterns may be grouped together, and a skip history for the group may be generated for a particular movie (or other content 108) based on the skip command activity of the receivers 104 in the group who have watched the movie. Thereafter, the content 108 may be stopped, paused, or skipped when watching the movie based on the skip history for the group in which the user is a member, using any of the embodiments discussed herein.

Clustering users based on content viewing patterns and/or GUI navigation patterns and then customizing the user viewing experience (such as stopping, pausing and/or skipping portions of content, for example) is further described in U.S. Patent Application titled "Recommending Content Based On User Behavior Tracking And Analysis" by Sylvain Louboutin, filed on Nov. 21, 2016, which is herein incorporated by reference in its entirety.

Figure 2:
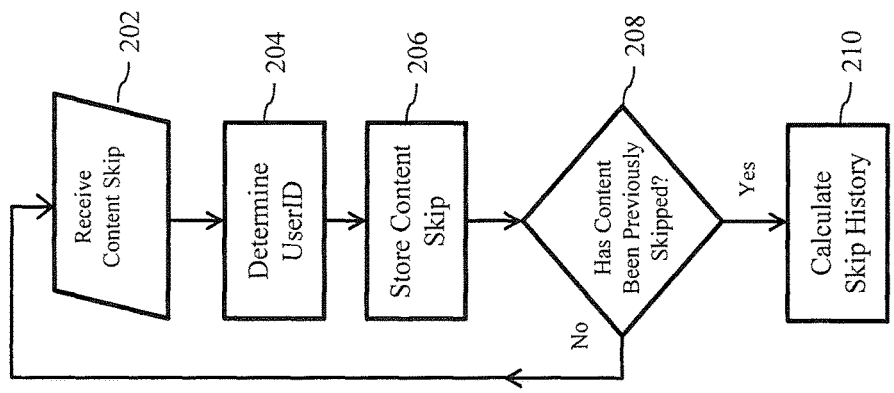
FIG. 2 is a flowchart illustrating a process for receiving and storing skip commands, according to some embodiments.

FIG. 2 is a flowchart 200 illustrating a process for storing received skip commands, according to some embodiments. Flowchart 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Flowchart 200 shall be described with reference to FIG. 1. However, flowchart 200 is not limited to that example embodiment.

According to an embodiment, at 202, content server 102 may receive skip commands and associated timestamps from receivers 104, where each received skip command and timestamp is associated with a content 108 that was being display when the skip command was issued. For example, content server 102 may receive a skip command and associated timestamp from receiver A 104A that are associate with content A 108A.

According to an embodiment, at 204, content server 102 may receive userID information from the receiver 104 that sent the skip command and associated timestamp. UserID information may comprise a serial number, location, IP address, MAC address, registration data, profile data, or any combination thereof—to name a few examples—of the receiver 104. For example, in 202, content server 102 may receive a skip command and an associated timestamp from receiver A 104A while content server 102 is streaming content A 108A to receiver A 104A. In 204, content server 102 may further receive userID information from receiver A 104A comprising the registration information and/or MAC address of receiver A 104A.

According to an embodiment, at 206, content server 102 may associate the received skip commands and associated timestamps with the received userID information of the respective receivers 104. Associating data together may comprise storing the data in the same table, storing the data in the same column, creating a pointer, or any combination thereof—to name a few examples. In an embodiment, content server 102 may store the skip commands and associated timestamps, and userID information in command storage 114.

According to an embodiment, at 208, content engine 102 may determine whether or not content server 102 has previously received skip commands associated with the same content 108 for each received skip command and associated timestamp. For example, in 202, content server 102 may receive a skip command and associated timestamp associated with content B 108B. In 208, content server 102 may then determine whether it has previously received skip commands and associated timestamps associated with content B 108B. In an embodiment, content server 102 may make this determination by searching command storage 114 for skip commands and associated timestamps that are also associated with the same content 108 as the received skip command and associated timestamp. If content server 102 determines that it has previously received skip commands associated with the same content 108 as the received skip command and associated timestamp, the system may move to 210, otherwise 202 is repeated.

According to an embodiment, at 210, content server 102 may determine a skip history for the content associated with the received skip command and associated timestamp. For example, as discussed above, content server 102 may calculate the crowd source beginning and end of a skip command of the content by averaging corresponding timestamps associated with skip commands stored in the command storage 114. The skip history of a given skip command calculated in 210 may include the number of received skip commands considered in the determination of the crowd source beginning and end of the skip command, as well as the crowd source beginning and end themselves.

According to an embodiment, in 210, content server 102 may determine a skip history based on a group of receivers 104. Receivers 104 may be grouped based upon a geographical location of receivers, viewing profile of the receivers, content streamed to the receivers, genres of content streamed to the receivers, runtimes of content streamed to the receivers, the connection of the receivers to content server 102, or any combination thereof to name a few examples. For example, group A of receivers 104 may include receivers that have watched over 10 hours of comedy movies in North America. In an embodiment, content server 102 may determine a group of receivers based upon the viewing profiles created for receivers 104 and the userID information received from receivers 104.

Further in 210, according to an embodiment, content server 102 may store the calculated skip history in command storage 114.

Figure 3:
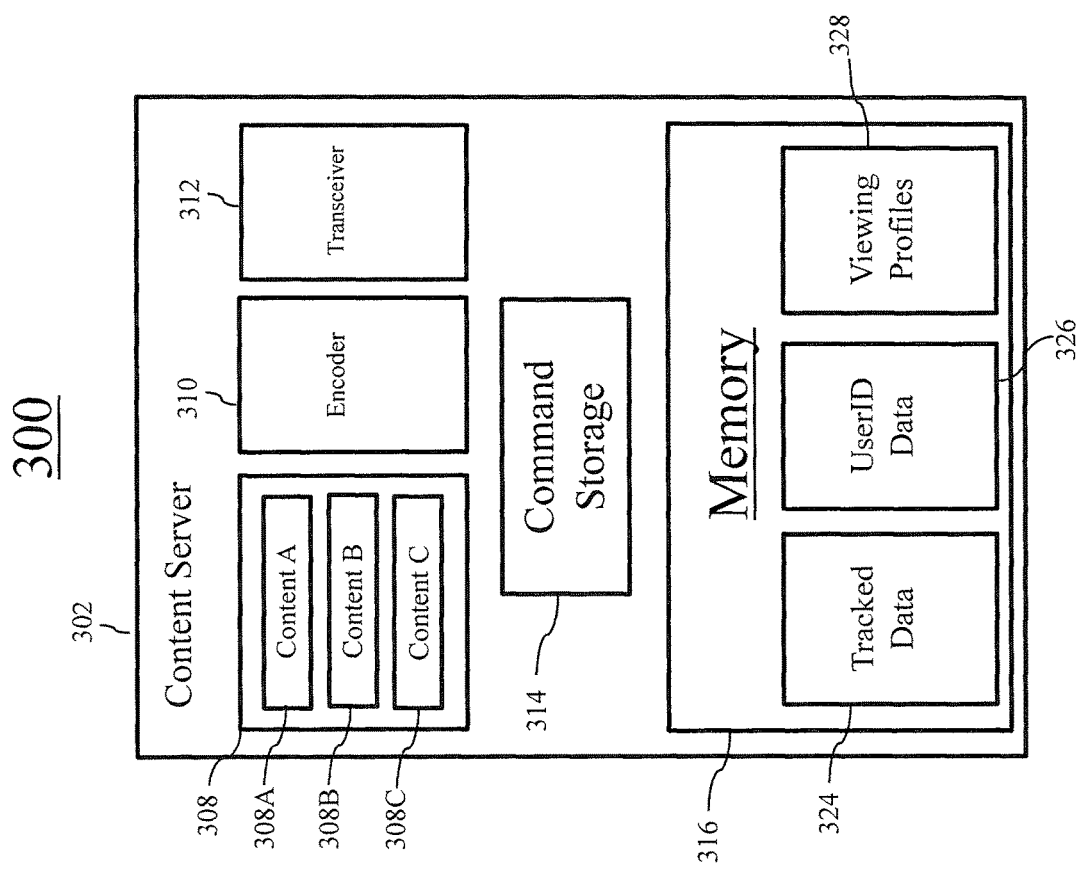
FIG. 3 is a block diagram of a system for viewer profile storage, according to some embodiments.

FIG. 3 is a block diagram of a system 300 for viewer profile storage, according to some embodiments. According to an embodiment, system 300 for viewer profile storage may include one or more content servers 302 comprising content 308 (made up of, for example, content A 308A, content B 308B, and content C 308C), encoder 310, transceiver 312, command storage 314, and memory 316. In an embodiment, within memory 316 may be stored tracked data 324, userID data 326, and viewing profiles 328.

It should be noted that FIG. 3 shows an illustrative embodiment; other embodiments may include more or less devices than that shown in FIG. 3. Also, content servers 300 may communicate with receivers 104 and other devices via network 122, and may be the same or different as content servers 102 shown in FIG. 1.

In an embodiment, content sever 302 may track content 308 streamed to receivers (such as, for example, receivers 104). The tracking may encompass tracking the duration, type, timing, genre, runtime, rating—or any combination thereof—of the content delivered to a receiver 104. Content server 302 may further store tracked data 324 in memory 316 and associate the tracking data with the receiver 104 that the tracked content was delivered to. Associating tracked data 324 with the receiver may encompass storing tracked data 324 in the same table as a reference to the receiver 104, storing tracked data 324 in the same column as a reference to the receiver 104, creating a pointer, or any combination thereof—to name a few examples. For example, content server 302 may track the run times and ratings of content 308 delivered to a receiver 104 and store tracked data 324, comprising the run times and ratings, within the same table as a reference to the receiver 104 within memory 316.

In an embodiment, content server 302 may build viewing profiles 328 for receivers 104 from tracked data 324. As discussed in FIG. 1, a viewing profile 328 may include the viewing preferences of receiver including the durations, types, timings, genres, runtimes, ratings—or any combination thereof—of the content most often streamed or otherwise delivered to the receiver. In an embodiment, content server 102 may build multiple viewing profiles 328 for a receiver 104 based upon userID data 326 received and stored from a receiver 104. For example, content server 102 may build multiple viewing profiles 328 for a receiver 104 if userID data 326 comprises multiple distinct registration or profile data sent from the receiver.

Figure 5:
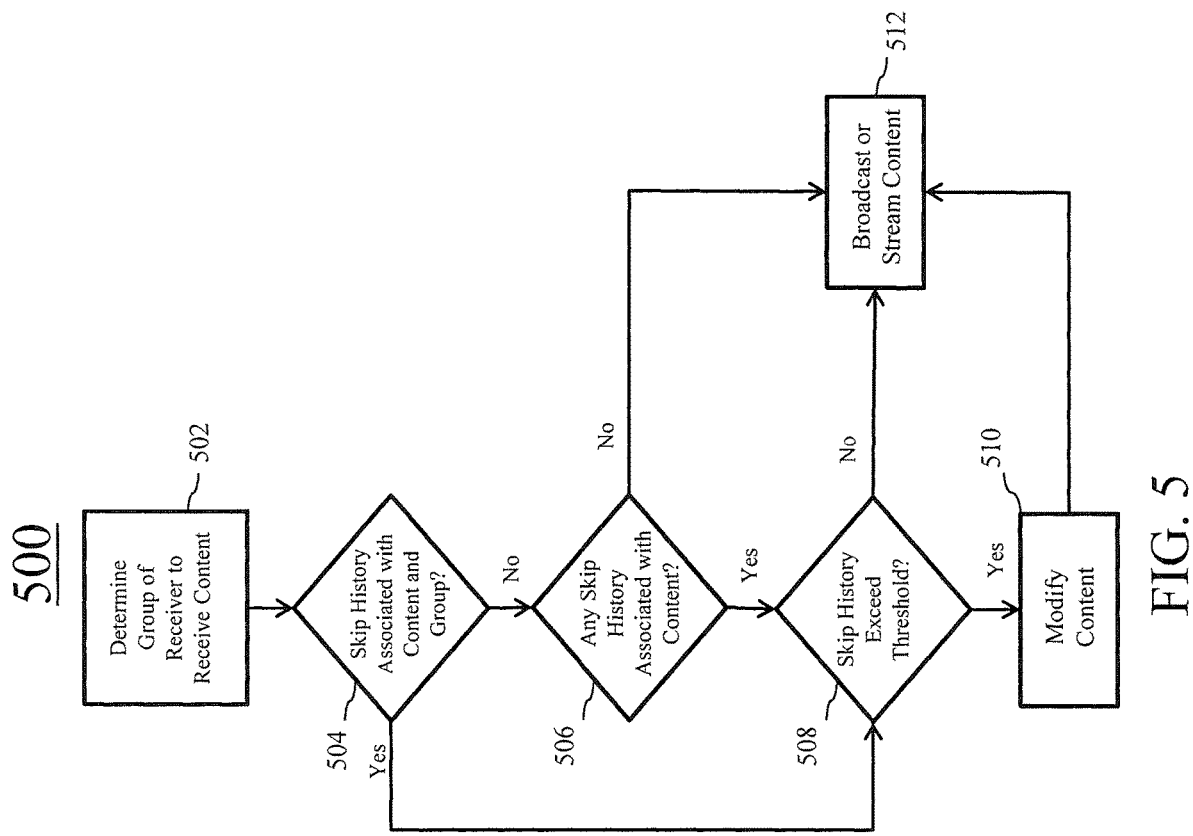
FIG. 5 is a flowchart illustrating a process for streaming or otherwise delivering content based upon skip histories, according to some embodiments.

According to an embodiment, content server 302 may use viewing profiles 328 to select new content to be streamed to a receiver 104 when a content 308 to be streamed to a receiver 104 is skipped according to skip histories, as discussed in FIG. 5.

FIG. 4 is a flowchart 400 illustrating a process for assigning a skip rating to a skip history, according to some embodiments. Flowchart 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Flowchart 400 shall be described with reference to FIG. 1. However, flowchart 400 is not limited to that example embodiment.

In an embodiment, flowchart 400 is performed by content server 102 in response to storing a skip history, as discussed in FIG. 2.

According to an embodiment, at 402, content server 102 may determine the number of skip commands used in the creation or updating of a skip history. For example, a skip history may have been determined from a skip command 1 and associated timestamp 1 comprising a fast forward command at the 45 second mark of content C 108C, and a skip command 2 and associated timestamp 2 comprising a resume play command at the 126 second mark of content C 108C, all received from the same receiver 104. Further, the skip history may have been determined from a skip command 3 and associated timestamp 3 comprising a fast forward command at the 47 second mark of content C 108C, and a skip command 4 and associated timestamp 4 comprising a resume play command at the 122 second mark of content C 108C, all received from a different receiver 104. From this, content server 102 may determine that 4 skip commands (skip command 1, skip command 2, skip command 3, and skip command 4) were used in the creation of the skip history.

In an embodiment, at 404, content server 102 may determine the number of receivers 104 from which the skip commands used in the creation of the skip history are received. As an example, continuing the non-limiting example discussed at 402, the skip history may have been determined from a fast forward and resume play command received from a first receiver, and a fast forward and resume play command received from a second receiver. From this, content server 102 may determine that the skip commands used in the creation of the skip history were received from 2 receivers (the first receiver and the second receiver).

According to an embodiment, at 406, content server 102 may determine a skip rating for the skip history. In some embodiments, the skip rating may comprise a ratio between the number of skip commands to the number of receivers used in the creation of the skip history, an equation involving the number of skip commands to the number of receivers used in the creation of the skip history, a normalized scale involving the number of skip commands to the number of receivers used in the creation of the skip history, or any combination thereof—to name a few examples. For example, continuation the non-limiting example as discussed at 402 and 404, the skip history may have been determined from 4 skip commands from 2 receivers. From this, content server may, for example, determine a skip rating comprising a ratio between the number of skip commands to the number of receivers, or 2 (4/2) in this case.

In an embodiment, at 408, content server 102 may associate the determined skip rating with the skip history. Associating the skip rating with the skip history may encompass creating a pointer, storing the skip rating and skip history in the same table, column, or row, or any combination thereof to name a few examples.

FIG. 5 is a flowchart 500 illustrating a process for selectively streaming or otherwise delivering content based upon skip histories, according to some embodiments. Flowchart 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Flowchart 500 shall be described with reference to FIG. 1. However, flowchart 500 is not limited to that example embodiment.

In an embodiment, flowchart 500 is performed by content server 102 in response to receiving a request for content 108 from a receiver 104.

According to an embodiment, at 502, content server 102 may determine whether the receiver 104 who requested the content 108 is part of a group. As mentioned in the discussion of FIG. 2, receivers 104 may be clustered into a group based on geographical location of receivers, viewing profile of receivers, content streamed to receivers, genres of content streamed to receivers, runtimes of content streamed to receivers, the connection of receivers to content server 102, or any combination thereof—to name a few examples.

According to an embodiment, at 504, content server 102 may determine if there is a skip history for the entirety, portion, or specific section of the content 108 requested to be streamed or otherwise delivered, for a group for which the requested receiver 104 is a member. If content server 102 determines that group skip history exists, the system may move to 508, otherwise the system may move to 506.

According to an embodiment, at 506, content server 102 may determine if there is any skip history for the entirety, portion, or specific section of the content 108 requested to be streamed or otherwise delivered to a receiver 104. This determination may be made by, for example, searching command storage 114 for a skip history for the entirety, portion, or specific section of the content 108 requested to be streamed or otherwise delivered. If content server 102 determines that skip history exists, the system may move to 508, otherwise the system may move to 512.

It is noted that the ordering of steps 504 and 506 favor the skip history of the group over the skip history of the requested content. In other embodiments, the ordering of steps 504 and 506 is reversed so the opposite is the case.

According to an embodiment, at 508, content server 102 may determine if the skip history determined in 504 or 506 exceeds a threshold value. As discussed above, each skip history includes information identifying the number of skip commands considered in the calculation of the crowd source boundaries of a skip command. Thus, in 508, content server 102 may determine if this value of the skip history determined in 504 or 506 exceeds a threshold value. For example, assume for a given skip history 30 skip commands were used to calculate the crowd source beginning and end of a given skip command, and also assume the threshold is 20. In this case, content server 102 would proceed to step 510. In this manner, the content server 102 only skips over content if there is significant crowd source data supporting skipping over the content.

In another embodiment, at 508, content server 102 may determine if the skip rating associated with the skip history exceeds a threshold value. For example, a skip history may have a skip rating 0.6 determined from the number of skip commands and receivers used in the creating of the skip history. Assume the threshold is 0.5; in this case content server 102 would proceed to step 510.

According to an embodiment, at 510, content server 102 may modify the content 108 to be streamed or otherwise delivered to a receiver 104. Modifying the content 108 may include deleting from the content that portion identified by the crowd source beginning and end of the skip command corresponding to the skip history determined in step 504 or 506. Alternatively, that portion identified by the crowd source beginning and end of the skip command may be marked (via pointers or metadata, for example).

In another embodiment, at 510, modifying the content 108 may encompass skipping the entirety of a content and selecting a new content 108 to stream or otherwise deliver to a receiver 104. Modifying the content 108 to skip the entirety of the content may occur when, as an example, the skip history is associated with the entirety of a content 108

(i.e. not just a portion or specific section). According to an embodiment, content server 102 may select the new content 108 to stream or otherwise deliver to a receiver 104, based upon a viewing profile constructed for the receiver 104, as discussed in FIG. 3. For example, when selecting a new content 108 to stream or otherwise deliver to a receiver 104, content sever 102 may select a new content that is similar to or matches the durations, types, timings, genres, runtimes, or ratings of content 108 most often streamed to the receiver 104 according to the viewing profile of receiver 104. In this manner, the new content 108 to be streamed or otherwise delivered to the receiver 104 is based upon the viewing preferences of the receiver 104.

In some embodiments, steps 508 and 510 may be performed for each skip command of the requested content associated with skip histories identified in step 504 or 506.

According to an embodiment, at 512, content server 102 may stream the requested content 108 to the requesting receiver 104 for display on the associated display 106. In cases where step 510 was performed before step 512, then the content 108 streamed to the receiver 104 will not include the content associated with the skip histories/skip commands identified in either step 504 or 506. Generally, such skipped content may represent content of little or no interest to users (as determined in a crowd sourced manner, as discussed above). For example, such skipped content may include opening credits, superfluous scenes, meaningless dialogue, scenes with poor acting or singing, advertisements, political commentary, age inappropriate content, distasteful content, and/or any other content deemed of little or no interest to users.

Figure 6:
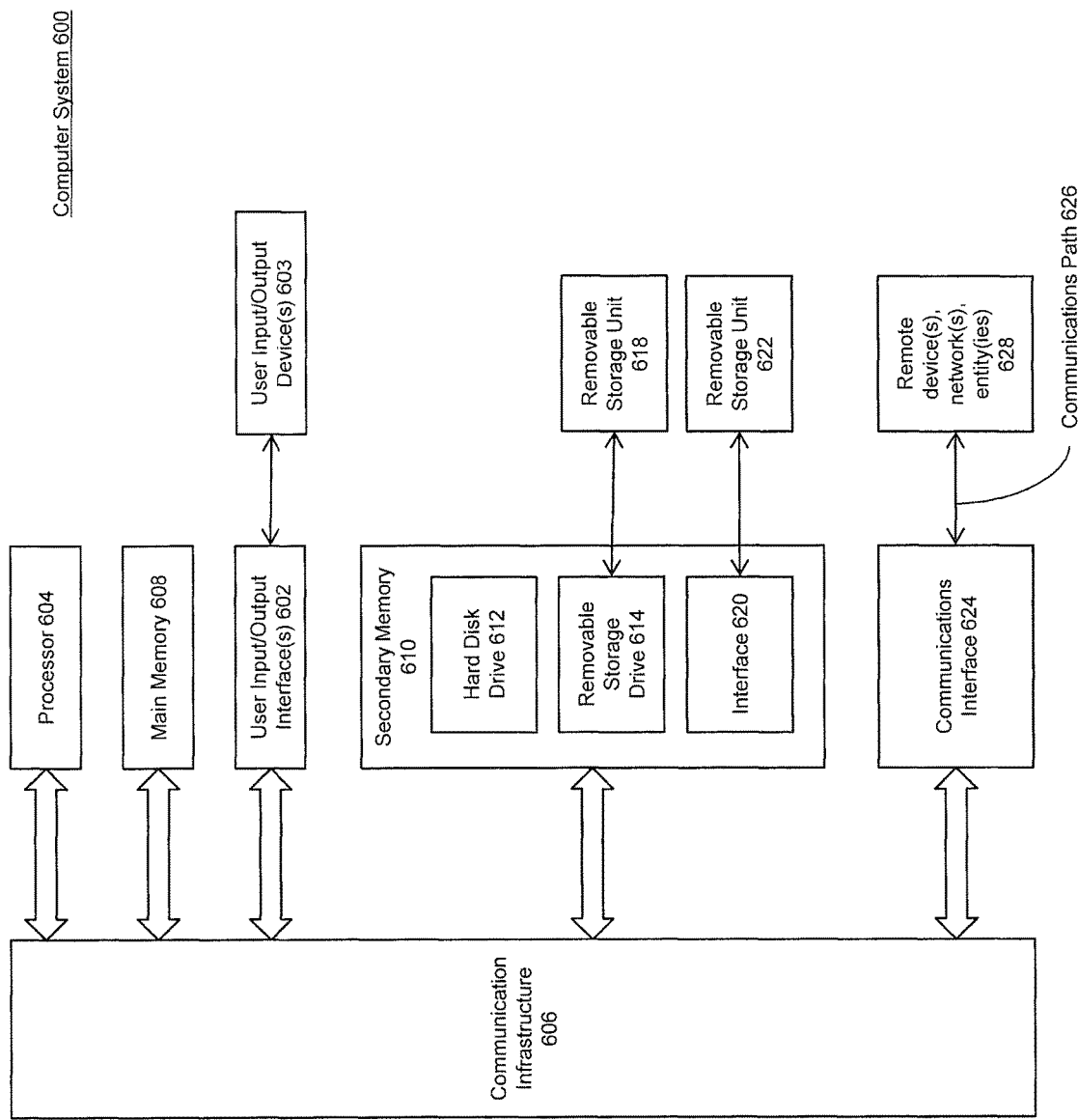
FIG. 6 is an example computer system useful for implementing various embodiments.

Various embodiments can be implemented, for example, using one or more computer systems, such as computer system 600 shown in FIG. 6. One or more computer systems 600 can be used, for example, to implement the systems, components, flowcharts and operations of FIGS. 1-3. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 408 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method in a content server, comprising: clustering a user into a group of users, wherein each member of the group satisfies a group criteria indicating a minimum amount of time that a first content was streamed to a receiver associated with the member; receiving a plurality of skip commands associated with a second content from a plurality of receivers associated with members of the group while the receivers are displaying the second content to the members of the group; generating a crowd source skip history for the content for the group using at least the received skip commands; calculating, based on the crowd source skip history, a skip rating comprising a ratio of a determined number of the skip commands to a determined number of the receivers associated with the determined number of skip commands; receiving a request for the second content from a receiver associated with the clustered user; transmitting a stream of the second content to the receiver associated with the clustered user using the skip rating for the second content, such that a portion of the second content identified by the crowd source skip history is excluded from the stream and transmitting the stream of second content to a user who is a member of a second group, wherein the stream of second content includes the portion of the second content identified by the crowd source skip history.

2. The method of claim 1, wherein the transmitting comprises:
   determining the skip rating exceeds a threshold; and
   responsive to the determination, using the crowd source skip history to transmit the stream of the second content to the receiver associated with the clustered user.

3. The method of claim 2, wherein the generating comprises:
   receiving timestamps associated with the skip commands; and
   calculating a crowd source beginning and ending of a given skip command using the received timestamps.

4. The method of claim 3, wherein the transmitting comprises:
   using the calculated crowd source beginning and ending to exclude the portion of the second content from the stream of the second content.

5. A system, comprising: a memory; and at least one processor communicatively coupled to the memory and configured to: cluster a user into a group of users, wherein each member of the group satisfies a group criteria indicating a minimum amount of time that a first content was streamed to a receiver associated with the member; receive a plurality of skip commands associated with a second content from a plurality of receivers associated with members of the group while the receivers are displaying the second content to the members of the group; generate a crowd source skip history for the content for the group using at least the received skip commands; calculate, based on the crowd source skip history, a skip rating comprising a ratio of a determined number of the skip commands to a determined number of the receivers associated with the determined number of skip commands; receive a request for the second content from a receiver associated with the clustered user; transmit a stream of the second content to the receiver associated with the clustered user using the skip rating for the second content, such that a portion of the second content identified by the crowd source skip history is excluded from the stream; and transmit the stream of second content to a user who is a member of a second group, wherein the stream of second content includes the portion of the second content identified by the crowd source skip history.

6. The system of claim 5, wherein to transmit the at least one processor is further configured to:
   determine the skip rating exceeds a threshold; and
   responsive to the determination, use the crowd source skip history to transmit the stream of the second content to the receiver associated with the clustered user.

7. The system of claim 6, wherein to generate, the at least one processor is further configured to:
   receive timestamps associated with the skip commands; and
   calculate a crowd source beginning and ending of a given skip command using the received timestamps.

8. The system of claim 7, wherein to transmit, the at least one processor is further configured to:
   use the calculated crowd source beginning and ending to exclude the portion of the second content from the stream of the second content.

9. A tangible, non-transitory computer-readable device having instructions stored thereon that, when executed by at least one computing device, causes the at least one computing device to perform operations comprising: clustering a user into a group of users, wherein each member of the group satisfies a group criteria indicating a minimum amount of time that a first content was streamed to a receiver associated with the member; receiving a plurality of skip commands associated with a second content from a plurality of receivers associated with members of the group while the receivers are displaying the second content to the members of the group; generating a crowd source skip history for the content for the group using at least the received skip commands; calculating, based on the crowd source skip history, a skip rating comprising a ratio of a determined number of the skip commands to a determined number of the receivers associated with the determined number of skip commands; receiving a request for the second content from a receiver associated with the clustered user; transmitting a stream of the second content to the receiver associated with the clustered user using the skip rating for the second content, such that a portion of the second content identified by the crowd source skip history is excluded from the stream and transmitting the stream of second content to a user who is a member of a second group, wherein the stream of second content includes the portion of the second content identified by the crowd source skip history.

10. The non-transitory computer-readable device of claim 9, the transmitting further comprising:
  determining the skip rating exceeds a threshold; and
  responsive to the determination, using the crowd source skip history to transmit the stream of the second content to the receiver associated with the clustered user.

11. The non-transitory computer-readable device of claim 10, the generating further comprising:
  receiving timestamps associated with the skip commands; and
  calculating a crowd source beginning and ending of a given skip command using the received timestamps.

12. The non-transitory computer-readable device of claim 11, the transmitting further comprising:
  using the calculated crowd source beginning and ending to exclude the portion of the second content from the stream of the second content.

13. The method of claim 2, wherein further comprising:
  determining that the number of skip commands exceed a command threshold; and
  using the crowd source skip history to transmit the stream of the content to the receiver based on both the skip rating exceeding the threshold and the number of skip commands exceeding the command threshold.

14. The method of claim 1, wherein the minimum amount of time comprises the minimum amount of time consuming a particular genre of content including the first content.

15. The method of claim 1, wherein the minimum amount of time comprises streaming the first content more than a threshold number of times.

16. The method of claim 1, wherein the transmitting comprises deleting the portion of the second content identified by the crowd source skip history is excluded from the stream.

* * * * *